(12) United States Patent
Wang

(10) Patent No.: US 10,970,720 B2
(45) Date of Patent: Apr. 6, 2021

(54) ORDER PROCESSING METHOD AND DEVICE

(71) Applicant: ADVANCED NEW TECHNOLOGIES CO., LTD., Grand Cayman (KY)

(72) Inventor: Fan Wang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 88 days.

(21) Appl. No.: 16/162,855

(22) Filed: Oct. 17, 2018

(65) Prior Publication Data

US 2019/0050858 A1  Feb. 14, 2019

Related U.S. Application Data

(63) Continuation of application No. PCT/CN2017/079416, filed on Apr. 5, 2017.

(30) Foreign Application Priority Data

Apr. 18, 2016  (CN) .................. 201610239677.X

(51) Int. Cl.
*G06Q 20/40* (2012.01)
*G06Q 30/06* (2012.01)
*G06Q 20/02* (2012.01)
*G06Q 20/34* (2012.01)

(52) U.S. Cl.
CPC .......... *G06Q 20/407* (2013.01); *G06Q 20/02* (2013.01); *G06Q 20/351* (2013.01); *G06Q 30/0635* (2013.01)

(58) Field of Classification Search
CPC .... G06Q 10/10; G06Q 40/04; G06Q 20/4016; G06Q 30/0633; G06Q 30/04
See application file for complete search history.

(56) References Cited

U.S. PATENT DOCUMENTS

| 8,412,625 | B2 | 4/2013 | Pilo' |
| 8,799,084 | B2 | 8/2014 | Florek et al. |
| 8,843,405 | B1 | 9/2014 | Hartman et al. |
| 8,977,567 | B2 | 3/2015 | Aabye et al. |
| 2002/0099652 | A1 | 7/2002 | Herzen et al. |
| 2003/0078884 | A1 | 4/2003 | Bauman |

(Continued)

FOREIGN PATENT DOCUMENTS

| CN | 101655947 A | 2/2010 |
| CN | 101739766 A | 6/2010 |

(Continued)

OTHER PUBLICATIONS

Implementing Mastercard payment gateways services; https://www.mastercard.com/gateway/integration-guides.html (Year: 2015).*

(Continued)

*Primary Examiner* — Elizabeth H Rosen
*Assistant Examiner* — Amanulla Abdullaev

(57) ABSTRACT

An order processing method comprises: obtaining, by a third party payment institution, an order that is paid but not successfully delivered; and initiating, by the third party payment institution, a refund operation for the order.

14 Claims, 6 Drawing Sheets

(56) References Cited

U.S. PATENT DOCUMENTS

| | | | |
|---|---|---|---|
| 2003/0130958 A1* | 7/2003 | Narayanan | H04L 63/0823 705/73 |
| 2004/0019807 A1 | 1/2004 | Freund | |
| 2004/0039705 A1 | 2/2004 | Svancarek et al. | |
| 2004/0039916 A1 | 2/2004 | Aldis et al. | |
| 2005/0256750 A1* | 11/2005 | Hand | G06Q 10/06 705/5 |
| 2005/0256802 A1 | 11/2005 | Ammermann et al. | |
| 2006/0168614 A1 | 7/2006 | Salas et al. | |
| 2007/0250716 A1 | 10/2007 | Brunk et al. | |
| 2008/0270246 A1 | 10/2008 | Chen | |
| 2010/0288834 A1* | 11/2010 | Tichelaer | G06Q 20/04 235/380 |
| 2011/0231283 A1 | 9/2011 | Li et al. | |
| 2012/0053969 A1 | 3/2012 | Schukraft | |
| 2013/0006860 A1* | 1/2013 | Balasubramanian | G06Q 20/02 705/44 |
| 2013/0046625 A1* | 2/2013 | Grigg | G06Q 40/02 705/14.53 |
| 2013/0060682 A1 | 3/2013 | Nezu et al. | |
| 2013/0085938 A1* | 4/2013 | Stone | G06Q 40/02 705/41 |
| 2013/0275237 A1* | 10/2013 | Ramaratnam | G06Q 20/202 705/16 |
| 2014/0039942 A1* | 2/2014 | Groarke | G06Q 10/10 705/5 |
| 2014/0108496 A1* | 4/2014 | Heller | G06F 16/951 709/203 |
| 2014/0129429 A1 | 5/2014 | Lecuyer et al. | |
| 2015/0019417 A1 | 1/2015 | Andrews et al. | |
| 2015/0026004 A1* | 1/2015 | Fok | G06Q 30/0633 705/26.8 |
| 2015/0161690 A1* | 6/2015 | Collendavelloo | G06Q 30/04 705/30 |
| 2016/0180325 A1* | 6/2016 | Davis | G06Q 20/085 705/44 |
| 2016/0328763 A1 | 11/2016 | Jo | |

FOREIGN PATENT DOCUMENTS

| | | |
|---|---|---|
| CN | 102194177 A | 9/2011 |
| CN | 102880947 A | 1/2013 |
| CN | 103077454 A | 5/2013 |
| CN | 103186852 A | 7/2013 |
| CN | 105096167 A | 11/2015 |
| CN | 105279639 A | 1/2016 |
| EP | 1887506 A1 | 2/2008 |
| KR | 10-1533953 B1 | 7/2015 |
| TW | 201013557 A | 4/2010 |
| TW | 1462047 B | 11/2014 |
| WO | 2011/148873 A1 | 12/2011 |

OTHER PUBLICATIONS

How to redirect to an off-site payment form after checkout; https://blog.bluepay.com/how-to-redirect-to-an-off-site-payment-form-after-checkout (Year: 2014).*

International Search Report and Written Opinion for Application No. PCT/CN2017/079416, dated Jul. 11, 2017, 9 pages.

Office Action for Japanese Application No. 2019-505105 dated Oct. 8, 2019 (8 pages).

Notice of Substantive Examination Result for Indonesian Application No. PID201808309 dated Sep. 17, 2019 (4 pages).

Office Action for Taiwanese Application No. 106108021 dated Feb. 20, 2019 (7 pages).

International Preliminary Report on Patentability Chapter I for PCT Application No. PCT/CN2017/079416 dated Nov. 1, 2018 (9 pages).

Decision to reject for Taiwanese Application No. 106108021 dated May 28, 2019 (5 pages).

Search Report for European Application No. 17785328.0 dated Oct. 22, 2019 (8 pages).

First Search Report for Chinese Application No. 201610239677.X dated Jan. 20, 2020 (1 page).

First Office Action for Chinese Application No. 201610239677.X dated Feb. 6, 2020 (10 pages).

Office Action for Korean Application No. 10-2018-7033361 dated May 28, 2020.

Examination Report for European Application No. 17785328.0 dated Dec. 10, 2020.

Mark S. Silver, "Browser-based applications: popular but flawed?", Information Systems and E-business Management, Feb. 16, 2006.

* cited by examiner

ORDER PROCESSING METHOD AND DEVICE

CROSS REFERENCE TO RELATED APPLICATIONS

The present application is a continuation application of the International Patent Application No. PCT/CN2017/079416, filed on Apr. 5, 2017, and titled "Order Processing Method and Device," which claims priority to Chinese Patent Application No. 201610239677.X filed on Apr. 18, 2016 and entitled "Order Processing Method and Device." The entire contents of all of the above applications are incorporated herein by reference in their entirety.

TECHNICAL FIELD

This application relates to the field of online payment technologies, and in particular, to an order processing method and device.

BACKGROUND

With the constant development of internet technologies, people are increasingly using the internet to meet life's basic demands, such as online shopping, online navigation, online searching, and online registration, etc. Online shopping, in particular, has become an increasingly important way for people to make purchases.

When making online payments, people generally use a credit card or third party payment institution to carry out the payment. Typically, these payment modes are relatively simple when the payment is domestic, i.e., made within a country, but certain problems can arise in cross-border e-commerce. This is because, in cross-border e-commerce, if a user uses a browser to make a payment, it is often necessary to use browser redirection to notify the delivering party that a payment has been made. If the user closes the browser after making the payment, the delivering party has no way of learning of the information that the user has paid, and under these circumstances, the delivering party will not deliver.

In this situation, the user needs to actively initiate a refund request, at which point the delivering party conducts review and confirmation. Only after the delivering party has carried out the review and confirmation, the third party payment institution is notified to issue a refund. The refund review cycle is quite long, and the refund request flow is rather complicated.

An effective solution to this problem has yet to be addressed.

SUMMARY

The objective of this disclosure is to provide an order processing method and device, making it possible to quickly and simply refund the user after the user pays for an order and delivery is unsuccessful, and improving the user experience.

According to one aspect, an order processing method may comprise: obtaining, by a computer device of a payment institution, an order that is paid but not successfully delivered; and initiating, by the computer device of the payment institution, a refund operation for the order.

In some embodiments, the order is not successfully delivered by a delivering institution, the delivering institution comprises a foreign airline, and the delivering institution's delivery comprises issuing a ticket by the delivering institution for the paid order.

In some embodiments, wherein the order is not successfully delivered by a delivering institution and the obtaining, by a computer device of a payment institution, an order that is paid but not successfully delivered, the order processing method comprises: querying, by the computer device of the payment institution, a virtual UATP (Universal Air Travel Plan) card status of the paid order to obtain the order that is paid but not successfully delivered by the delivering institution.

In some embodiments, the querying, by the computer device of the payment institution, a virtual UATP card status of the paid order to obtain the order that is paid but not successfully delivered by the delivering institution comprises: after every first time period, querying through the UATP, by the computer device of the payment institution, one or more orders that were paid within the first time period but have a virtual UATP card status of an unconfirmed preauthorization; and selecting, by the computer device of the payment institution, an order from the one or more orders that were paid within the first time period but have the virtual UATP card status of the unconfirmed preauthorization as the order that is paid but not successfully delivered by the delivering institution.

In some embodiments, the querying, by the computer device of the payment institution, a virtual UATP card status of the paid order to obtain the order that is paid but not successfully delivered by the delivering institution comprises: determining, by the computer device of the payment institution, whether it has elapsed over a second time period since a current order was paid successfully; if it has elapsed over the second time period, querying, by the computer device of the payment institution, whether a virtual UATP card status of the current order is an unconfirmed preauthorization status; and if the virtual UATP card status of the current order is the unconfirmed preauthorization status, selecting, by the computer device of the payment institution, the current order as the order that is paid but not successfully delivered by the delivering institution.

In some embodiments, different orders are designated with second time periods of different lengths.

In some embodiments, the delivering institution uses browser redirection to carry out delivery operations for the paid order.

According to another aspect, an order processing system may comprise a processor and a non-transitory computer-readable storage medium storing instructions that, when executed by the processor, cause the order processing system to perform a method. The method comprises: obtaining an order that is paid but not successfully delivered; and initiating a refund operation for the order.

According to another aspect, an non-transitory computer-readable storage medium may store instructions that, when executed by a processor, cause the processor to perform an order processing method. The method comprises: obtaining an order that is paid but not successfully delivered; and initiating a refund operation for the order.

According to another aspect, an order processing device disposed within a payment institution may comprise: an acquisition module configured to obtain an order that is paid but not successfully delivered by a delivering institution; and a refund module configured to actively initiate a refund operation for the paid order for which delivery is unsuccessful.

The order processing method and device provided by this disclosure may use active triggering by a payment institution to query whether a paid order has been delivered. For a paid order that has not been delivered, the payment institution actively triggers a refund operation, thus making it possible to quickly refund orders requiring a refund, solving the technical problem of overly complicated order refund flows and lengthy refund cycles in the current technologies, and achieving the technical effects of effectively shortening the refund cycle and improving the user experience.

BRIEF DESCRIPTION OF THE DRAWINGS

To more clearly explain the technical schemes in the embodiments of this disclosure or in the current technologies, a simple explanation of the accompanying drawings required to describe the embodiments or current technologies is given below. The accompanying drawings in the following description are merely some embodiments recorded in this disclosure. For a person having ordinary skill in the art, without spending creative labor, it is possible to obtain other accompanying drawings based on these accompanying drawings.

DETAILED DESCRIPTION

To enable a person in this technical field to better understand the technical schemes of this disclosure, in combination with the accompanying drawings of the embodiments of this disclosure, a clear and comprehensive description of the technical schemes in the embodiments of this disclosure is given below. The described embodiments are merely some, rather than all, of the embodiments of this disclosure. Based on the embodiments of this disclosure, and without making creative labor, all other embodiments obtainable by a person having ordinary skill in the art shall fall within the scope of protection of this disclosure.

Figure 1:
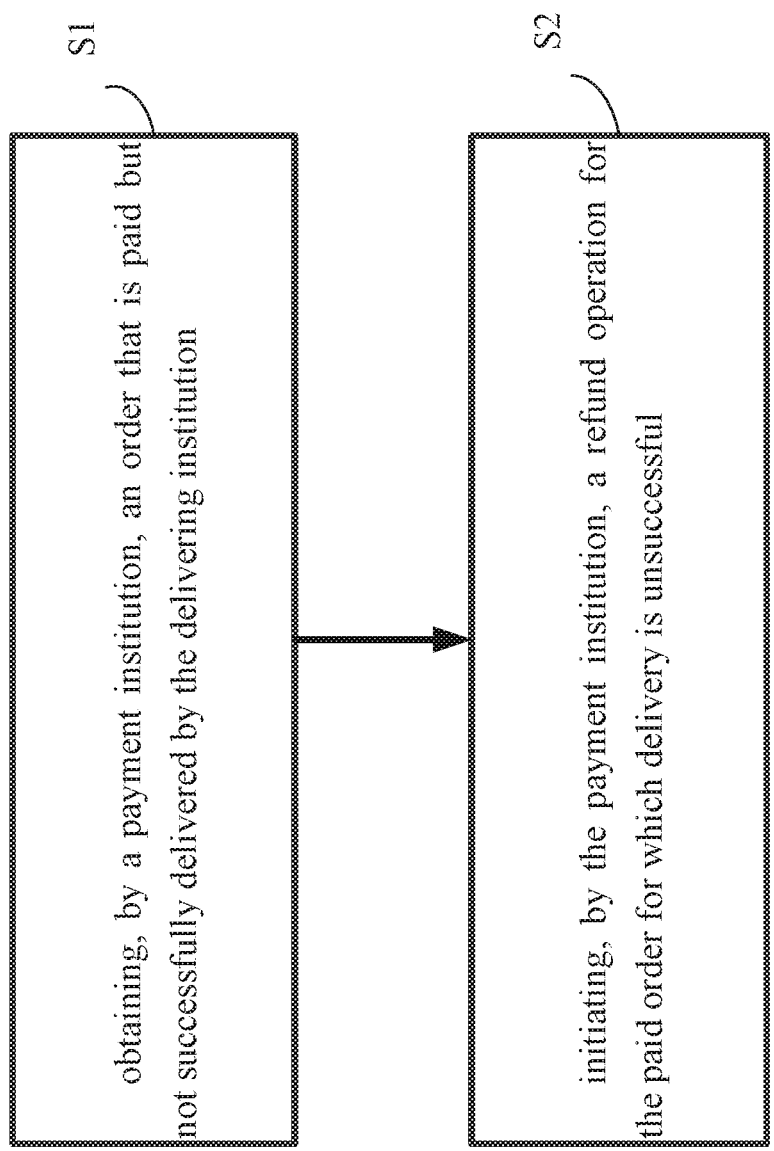
FIG. 1 is a method flow diagram of an order processing method according to some embodiments of the present disclosure.

In conjunction with the accompanying drawings, the following is a detailed explanation of the order processing method and device of this disclosure. FIG. 1 is a method flow diagram of an order processing method according to some embodiments of the present disclosure. Even though this disclosure provides the method operation steps or device structures of the embodiments or accompanying drawings described below, based on conventional or non-creative labor, the method or device may comprise more or fewer operation steps or module structures. In steps or structures for which there are no logically required causal relationships, the implementation sequence of the steps or the module structure of the device is not limited the implementation sequence or module structure provided by the embodiments of this disclosure. During actual implementation of the device or end product of the method or module structure, sequential implementation or parallel implementation is possible in accordance with the method or module structure connections shown in the embodiments or accompanying drawings (e.g., in a parallel processor or multithread processing environment).

This disclosure uses user purchasing of plane tickets from foreign airlines as an example, and actively issues a refund for such scenarios prone to having regular delivery impossible due to certain faulty operations after the user has paid, without carrying out a series of complex refund operations only after waiting for the customer to request a refund. Because the refund is actively conducted by a third party payment structure, it is possible to quickly and simply implement refund operations. For example, a status acquisition and interpretation system is added within the third party payment institution, thus enabling the third party payment institution to promptly discover a situation in which payment has been made with no delivery. This disclosure may be applied not only to situations in which a user purchased a plane ticket from a foreign airline, but also to other online payment transactions.

For example, as shown in FIG. 1, an embodiment of the order processing method provided by this disclosure may comprise:

S1:obtaining, by a third party payment institution, an order that is paid but not successfully delivered.

That is, after a user completes the payment, the third party payment institution actively and periodically determines whether the delivery is successful, instead of not discovering the unsuccessful delivery until the user applies for a refund. For example, after every time period (the time period can be preset, e.g., after every hour), the third party payment institution can obtain all of the payment orders within this time period, then determine, one by one, whether these payment orders have been successfully delivered. Also, a timestamp may be configured for every successfully paid order, then after a preset time (e.g., 30 minutes) after this order was paid, whether this order has been delivered can be determined. For example, order A is paid at 8:00 AM, and 8:30 AM, the third party payment institution can actively determine whether order A has been delivered.

The two preceding determination mechanisms are simply to better explain this disclosure. Other trigger mechanisms can be employed to make a determination, e.g., a mode combining these two modes, or configuring different preset times for different orders.

Figure 2:
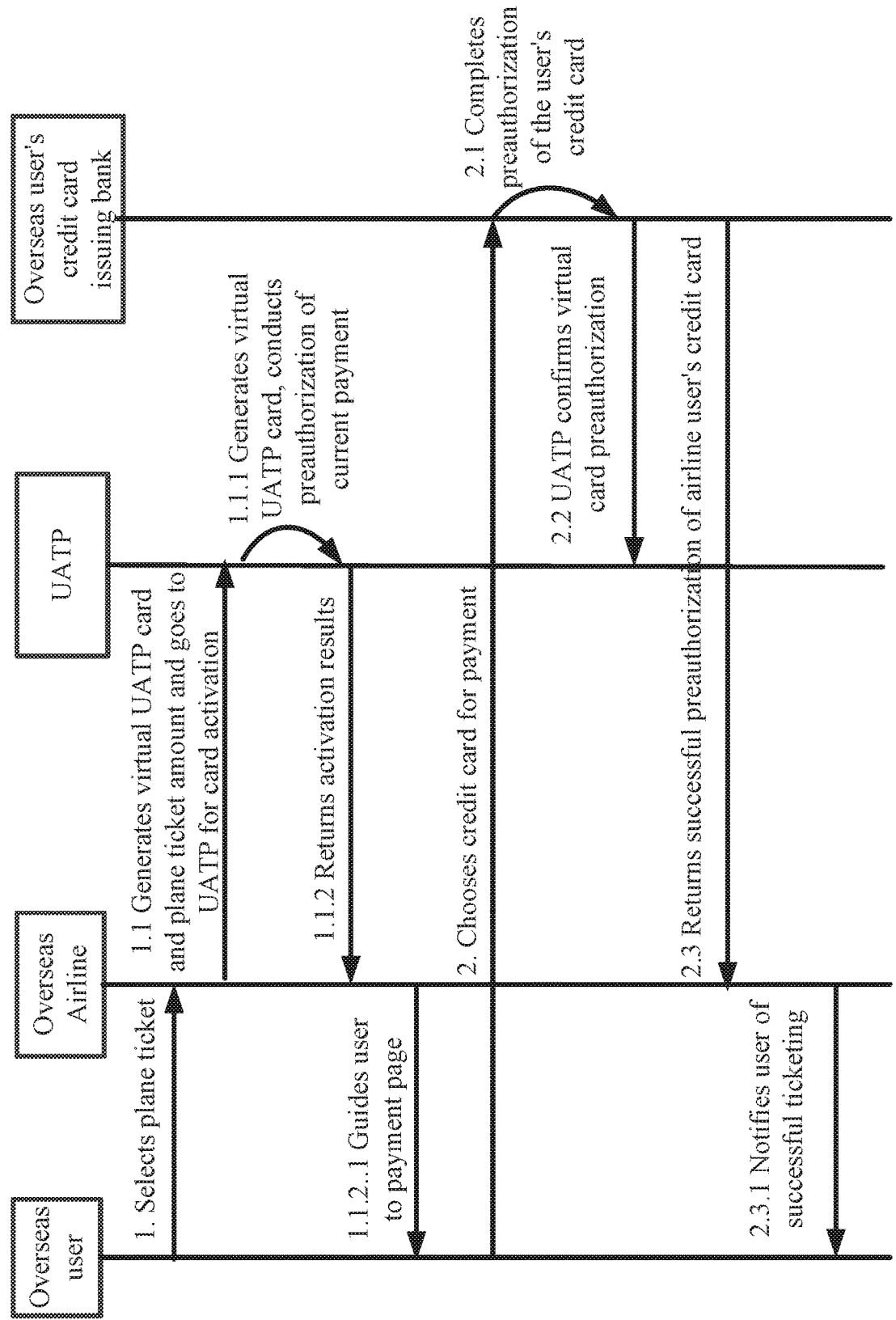
FIG. 2 is an interaction flow diagram for an existing ticket in this application according to some embodiments of the present disclosure.

With the constant development of cross-border e-commerce, more and more foreign airlines are using online payment modes to conduct plane ticket sales to domestic users. When conducting online plane ticket sales services, foreign airlines generally elect to link up with UATP (Universal Air Travel Plan) in order to lower the high costs associated with the user and airlines using credit card as the payment and settlement tool. UATP is a business travel payment network shared by global airlines. The UATP card is issued by airlines around the world, and it is a low-cost payment scheme provided by airlines to its business customers. UATP promises free services for its airlines. Below, an explanation is given using the active refund flow as an example when a cross-border purchase of a plane ticket is made, and prior to this, an explanation is given for the existing ticket and refund flow for a cross-border plane ticket purchase:

As shown in FIG. 2, the flow for an overseas user makes a foreign purchase of a plane ticket from an airline company linked to UATP primarily comprises: after the user selects a plane ticket, the overseas airline generates a plane ticket amount and asks UATP to perform card activation; UATP claims a virtual UATP card, conducts preauthorization for the current payment, and returns the activation results to the overseas airline. The overseas airline uses a browser page to guide the user to a payment page. The user chooses a credit card to complete the payment, then preauthorization of the user's credit card is conducted by the overseas user's card issuing bank. UATP performs preauthorization confirmation for the virtual card. Next, the overseas user's card issuing bank returns the credit card preauthorization confirmation to the overseas airline, then the overseas airline issues a ticket and notifies the user of the successful ticket issuance.

However, during cross-border online ticket purchases as described above, the interactions between different institutions involved in the entire payment flow are conducted through browser page redirection modes. This can lead to problems. For example, if the payment by the user in Step 2.3 of FIG. 2 is successful, but the user carelessly closes the browser, this may cause the airline to fail to detect the user's successful payment action, in which case the overseas airline will not choose to issue a ticket. When this scenario is overseas, i.e., when the user is an overseas user, preauthorization cancellation costs are very low because the user employs credit card payment; it is possible to immediately cancel the preauthorization by the overseas user calling the issuing bank directly, solving the problem of payment without a ticket being issued. However, when a foreign airline conducts business domestically, it links up with a third party payment institution, and when the third party payment institution is not the card's issuing bank, it is extremely difficult for the user to conduct a refund. It is necessary to lodge an appeal with the overseas airline. Afterward, the overseas airline company initiates a third party payment institution refund. The flow is complicated, and the cycle is quite long.

Figure 3:
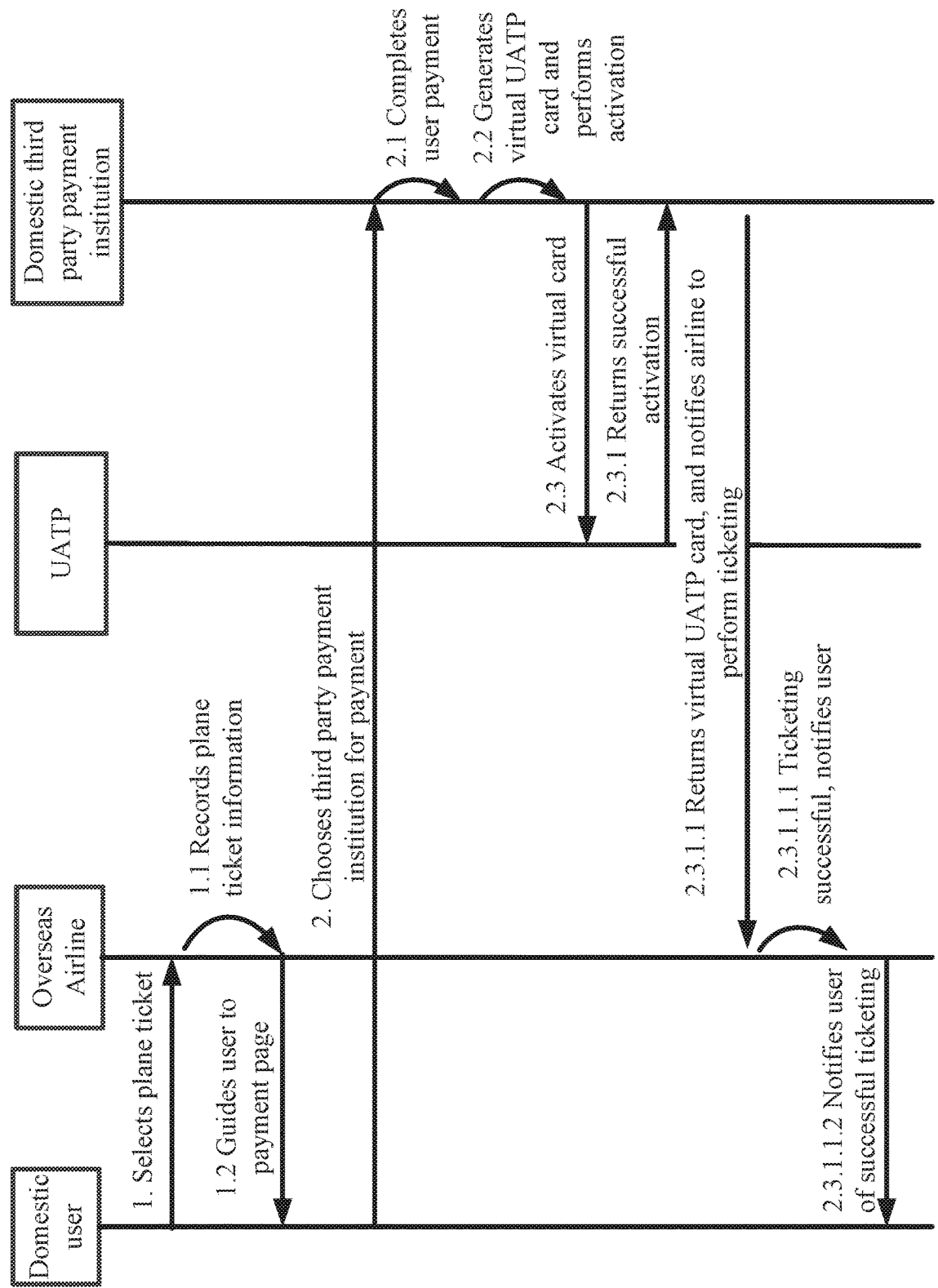
FIG. 3 is an interaction flow diagram for an existing cross-border ticket according to some embodiments of the present disclosure.
Figure 4:
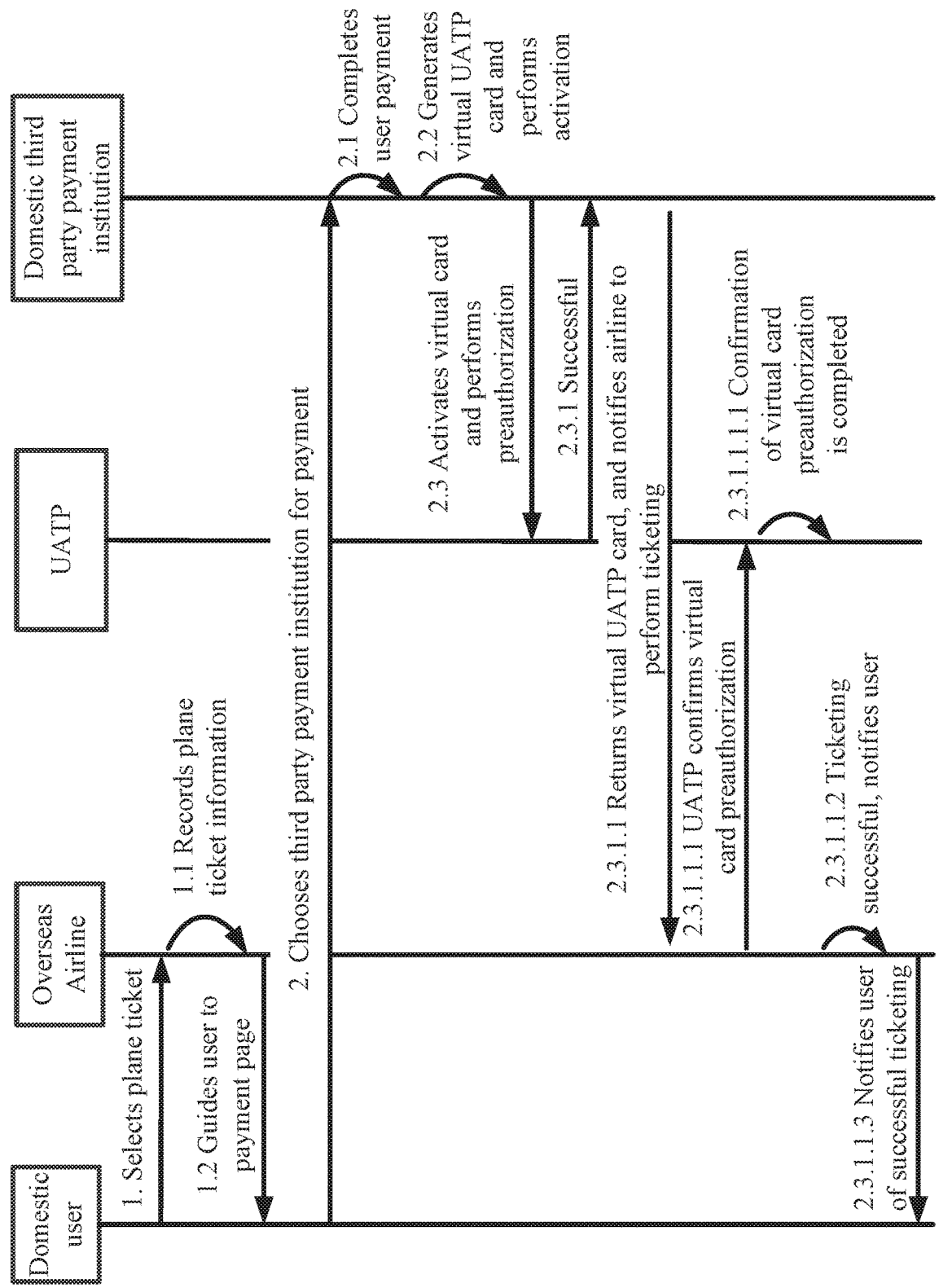
FIG. 4 is another interaction flow diagram for an existing cross-border ticket according to some embodiments of the present disclosure.

For situations in which payment is conducted through a domestic third party payment institution, as shown in FIG. 3, the flow such as virtual UATP card activation and the like comes after user payment. Then, after virtual UATP card activation, a ticket is issued through the overseas airline. In the payment flow under these circumstances, when the airline links with a third party payment institution, information notification is still conducted employing browser-based page redirection modes. The problem of the user closing the browser after successful payment persists, making it impossible for the airline to be notified of the payment results. Also, a situation may arise in which the user cannot obtain a plane ticket following payment. To this end, the third party payment institution presents an overseas airline payment request scheme, as shown in FIG. 4. After the user's successful payment becomes known, the overseas airline consults with UATP on whether the current virtual UATP card has achieved preauthorization confirmation. If so, the overseas airline issues a ticket, i.e., the overseas airline triggers the payment request by itself.

However, even with these operations, the problem of the user closing the browser may still arise, leading to a failure to notify the airline of payment results. This is because, after the user closes the browser, the overseas airline has no way of obtaining the card number of the virtual UATP card, and when the overseas airline actively makes a payment request, it is not possible to request payment for this transaction. Thus, if a given time limit has passed, the third party payment company can refund the payment amount to the user who has not received a plane ticket, but the entire flow relies upon a term of validity. Usually, this term of validity is reasonably set. e.g., for 7 days, such that the user must wait seven days before obtaining a refund, and the user experience is quite poor.

If the order processing method provided by this example is employed, the virtual card activation and user payment results are carried out within the third party payment institution and can be known by the third party payment institution. In this case, if the user closes the browser after making a payment and thus prevents ticket issuance, the third party payment institution can actively determine the results of preauthorization confirmation conducted by the overseas airline in UATP for the virtual UATP card. If the user makes a payment within the third party payment institution, but the virtual card's status as consulted by the third party payment institution from UATP is not a confirmed preauthorization status, it means that the faulty user operations have resulted in the overseas airline failing to confirm preauthorization with UATP. This also means that the airline has not issued a ticket. At such time, the third party payment institution can actively initiate a refund to the user, and does not need to wait for a payment request to undertake a refund operation. The entire refund cycle can be vastly shortened. For example, it is possible to set a confirmation rule for a third party payment institution. As an illustration, the two following modes can be employed to conduct confirmation:

1) A third party payment institution queries UATP after every preset time period (e.g., after every hour) for payments made for one or more orders within the preset time period, but having an unconfirmed preauthorization status as the virtual UATP card status. The third party payment institution uses these one or more orders that were paid within the preset time but have a virtual UATP card status of unconfirmed preauthorization as paid orders for which delivery by the delivering institution is unsuccessful. That is, a time cycle is set, and for each of these time cycles, the third party payment institution conducts centralized confirmation, finding which orders among these have been paid but have not entered a confirmed status, to be used as orders requiring a refund.

2) A third party payment institution determines whether it has elapsed over a second time period since the successful payment of the current order. The second time period may be preset by a user. If the second preset time period has elapsed, the third party payment institution queries from UATP whether the current order's virtual UATP card status is an unconfirmed preauthorization status; if it is an unconfirmed preauthorization status, the third party payment institution uses the current order as a paid order for which delivery by the delivering institution is unsuccessful. That is, a grace period is set for every order. When the grace period has expired, it is determined whether this order is an order that has been paid but not delivered. If yes, this order is used as an order requiring a refund.

S2: initiating, by the third party payment institution, a refund operation for the order.

That is, the payment institution actively carries out a refund to the user, because it is a determination operation actively triggered by the third party payment institution. This way, refund can be processed directly after confirmation that these orders require the refund, without having to wait for the delivering party to trigger the refund, thus making it possible to effectively boost refund efficiency.

For example, during implementation, the refund can be placed directly in the ordering user's third party payment institution account, returned to the ordering user's bundled bank card, or returned to the payer of a different payment amount. The specific place to which the refund is made can be specially designated.

For example, at a preset time (e.g., within one hour), the third party payment institution queries the following orders. Their corresponding preauthorization confirmation statuses are as shown in the table below:

| Order no. | Payment status | Preauthorization confirmation status |
|---|---|---|
| FJ00252 | Paid | Confirmed |
| HC03251 | Unpaid | Unconfirmed |
| GH89023 | Paid | Unconfirmed |
| IK35245 | Paid | Confirmed |
| NB4523 | Paid | Confirmed |

This table shows that the order GH89023 has a status of paid but unconfirmed, which indicates that this is an order involving faulty user operations and requires refund operations. At this time, the third party payment institution can refund this order as needed.

Using the method above, after the user makes a payment, if faulty operations lead to the browser being closed and the impossibility to conduct redirection, the third party payment institution's refund can be received within a short period of time, and the user can be informed of the reason for refund, effectively improving the user experience.

The following, in combination with a detailed embodiment, is an explanation of the entire order flow. In this embodiment, the example of a domestic user using a third party payment institution to conduct the cross-border purchase of a plane ticket from an overseas airline is used as an illustration. However, this detailed embodiment is merely to better explain this disclosure, and it does not constitute an improper limitation to this disclosure.

According to the current cross-border plane ticket processing mode of FIG. 4, in the existing user refund process for cross-border purchase of plane tickets, the user refund behavior relies upon the airline's payment request, and the refund initiative lies with the overseas airline. In this example, the refund initiative is transferred to the domestic third party payment institution. By actively consulting the preauthorization confirmation status of the UATP card, the third party payment institution makes a decision and determines whether to undertake refund operations for the user. This transfer of the refund initiative can effectively boost refund efficiency.

Figure 5:
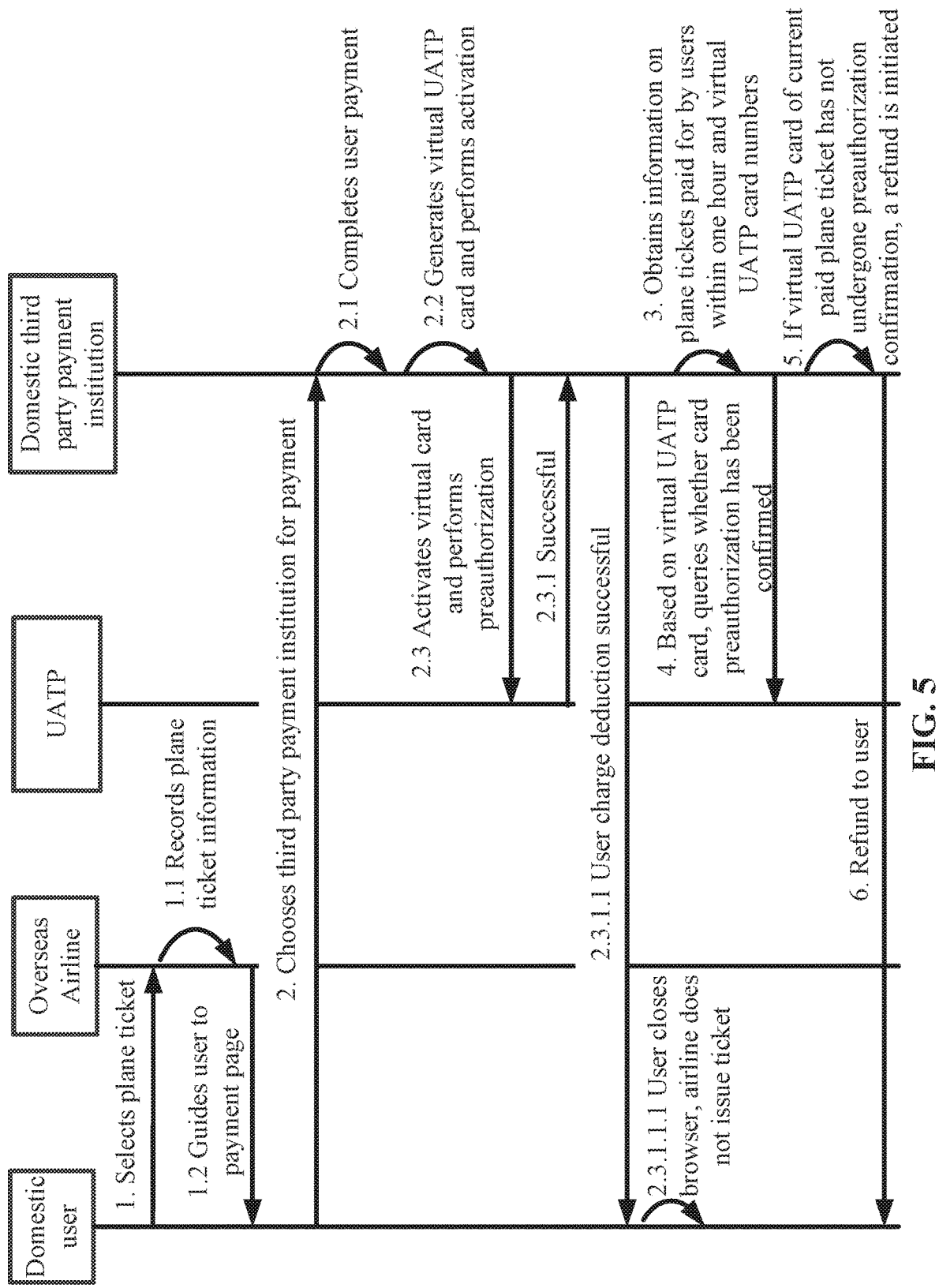
FIG. 5 is an interaction flow diagram for the cross-border ticket according to some embodiments of the present disclosure.

For example, the entire order processing process can include the following steps, as shown in FIG. 5:

Step 1: A domestic user goes to the website of an overseas airline and selects a plane ticket;

Step 1.1: The overseas airline records the plane ticket information;

Step 1.2: The overseas airline guides the user to a payment page;

Step 2: The domestic user chooses a third party payment institution for the payment;

Step 2.1: The third party payment institution completes the user's payment;

Step 2.2: The third party payment institution generates a virtual UATP card and requests activation;

Step 2.3: A domestic third party payment institution goes to UATP for UATP virtual card activation;

Step 2.3.1: UATP returns an activation successful result to the third party payment institution;

Step 2.3.1.1: The third party payment institution notifies the domestic user that the charge deduction was successful;

Step 2.3.1.1.1: The user closes the browser, and the overseas airline cannot learn that the user has paid, nor conduct preauthorization confirmation; therefore, it cannot issue a ticket;

Step 3: The third party payment institution obtains information on plane tickets paid for by users within one hour and virtual UATP card numbers;

Step 4: In UATP, the third party payment institution queries virtual card preauthorization statuses and determines whether the virtual cards have undergone preauthorization confirmation;

Step 5: If the virtual UATP card of the current successfully paid plane ticket has not undergone preauthorization confirmation, a refund is processed;

Step 6: The third party payment institution issues a refund to the user.

The above example demonstrates a third party payment institution querying confirmation for all orders within a preset time period. In an actual implementation, separate confirmation queries can be conducted for each order rather than employing a centralized approach. The specific processing mode can be determined in accordance with needs.

Furthermore, in the preceding example, a user making a cross-border purchase of a plane ticket is used as an illustration. This type of active confirmation by a third party payment institution on whether a refund is required can also be applied to other payment situations. As long as there is a protocol or rule for conducting confirmation according to a preset mode, this type of order processing mode can be applied to any payment flow to simplify refund operations and enable the user to more quickly obtain a refund.

Figure 6:
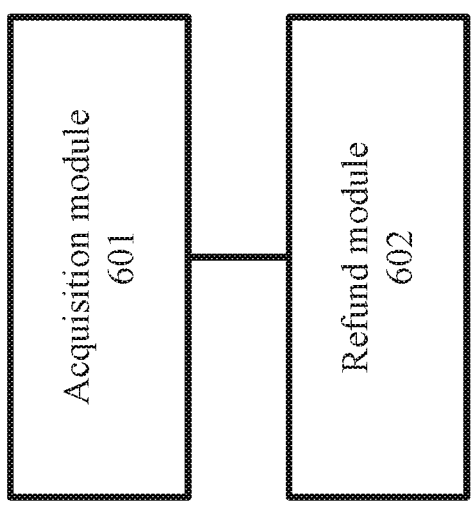
FIG. 6 is a structural block diagram for the order processing device according to some embodiments of the present disclosure.

Based on the same inventive concept, the embodiments of this disclosure also provide an order processing device, as described in the embodiments below. Because the solution principles of the order processing device are similar to the order processing method, for the implementation of the order processing device, reference can be made to the implementation of the order processing method, and their duplicated aspects will not be restated. As used below, the terms "element" or "module" are combinations of software and/or hardware that can achieve preset functions. Even though it is preferable for the described device to be implemented through software in the following embodiments, implementation through hardware or a combination of software and hardware can also be envisioned. FIG. 6 is a structural block diagram of the order processing device of an embodiment of this disclosure. This order processing device is located within a third party payment institution. As shown in FIG. 6, this order processing device can comprise: an acquisition module 601 and a refund module 602. An explanation of this structure is given below.

Acquisition module 601 can be configured to obtain a paid order for which delivery by the delivering institution is unsuccessful;

Refund module 602 can be configured to actively initiate a refund operation for the paid order for which delivery is unsuccessful.

In one embodiment, the delivering institution can comprise a foreign airline, and delivery by the delivering institution can comprise issuance of a ticket by the delivering institution.

In one embodiment, acquisition module 601 can be configured to query a virtual UATP card status of the paid order through UATP to obtain the order that is paid but not successfully delivered by the delivering institution.

In one embodiment, the acquisition module can comprise: a first query element configured to, after every first preset time period, query through the UATP one or more orders that were paid within the first preset time but have a virtual UATP card status of an unconfirmed preauthorization; first determination element configured to use the one or more orders that were paid within the first preset time but have the virtual UATP card status of the unconfirmed preauthorization as the order that is paid but not successfully delivered by the delivering institution.

In one embodiment, the acquisition module 601 can comprise: a determination element configured to determine whether it has elapsed over a second preset time period since a current order is paid successfully; a second query element configured to query through UATP whether a virtual UATP card status of the current order is an unconfirmed preauthorization status, if it is determined that the second preset time has elapsed; a second determination element configured to use the current order as the order that is paid but not successfully delivered by the delivering institution, if the virtual UATP card status of the current order is determined to be the unconfirmed preauthorization status.

In one embodiment, different orders are designated with second preset time periods of different lengths.

In one embodiment, the delivering institution uses browser redirection to carry out delivery operations for the paid orders.

In some embodiments, the various modules and units of the order processing device may be implemented as software instructions (or a combination of software and hardware). That is, the order processing device described with reference to FIG. 6 may comprise a processor and a non-transitory computer-readable storage medium storing instructions that, when executed by the processor, cause one or more components (e.g., the processor) of the order processing device to perform various steps and methods of the modules and units described above. The order processing device may also be referred to as an order processing system. In some embodiments, the order processing device/system may include a mobile phone, a tablet computer, a PC, a laptop computer, a server, or another computing device.

The order processing method and device provided by this disclosure uses active triggering by a third party payment institution to query whether a paid order has been delivered. For a paid order that has not been delivered, the third party payment institution actively triggers a refund operation, thus making it possible to quickly refund orders that need to be refunded, and solving the technical problem of overly complicated order refund flows and lengthy refund cycles in the current technologies. It achieves the technical effects of effectively shortening the refund cycle and improving the user experience.

Even though the details of this disclosure use an order processing flow for a cross-border plane ticket as an illustration, this disclosure can also be applied to other order processing processes, and is not limited to the demonstrated examples. In actual application processes, there is no limitation to fully follow the mode mentioned to process orders. The descriptions involved in the embodiments of this disclosure are merely some applications. Embodiments that have been slightly modified, on the basis of certain standards, models, and methods, can also execute the schemes of the embodiments of this disclosure. Of course, the same application can be achieved while conforming to other non-creative variants of the processing method steps of the embodiments of this disclosure, for which further details will not be given.

Even though this disclosure provides method operation steps as presented in the embodiments or flow diagrams, based on conventional or non-creative effort, more or fewer operation steps may be included. The step sequence given as an example in an embodiment is merely one of various step execution sequences, and does not represent the only execution sequence. During an actual implementation of the device or customer-end product, sequential implementation or parallel implementation is possible in accordance with the methods shown in the embodiments or accompanying drawings (e.g., in a parallel processor or multithread processing environment).

The device or modules illustrated in the preceding embodiments can be achieved by a computer chip or entity, or by a product possessing certain functions. For the sake of convenience, when describing the preceding device, the functions are separately described as divided into different modules. When implementing this disclosure, the functions of each module can be achieved in the same or multiple software and/or hardware units. Of course, a module achieving a certain function can be achieved through a combination of multiple sub-modules or sub-elements.

The methods, device, or modules in this disclosure can be implemented by a controller through a computer-readable program code mode, achieved by any appropriate means. For example, a microprocessor or processor can be adopted as the controller, and memory can be in the form of a computer-readable medium, logic gate, switch, application specific integrated circuit (ASIC), programmable logic controller, or embedded microcontroller of computer-readable program code (e.g., software or firmware) executed by this (micro) processor. Examples of controllers include but are not limited to the following microcontrollers: ARC 625D, Atmel AT91SAM, Microchip PIC18F26K20, and Silicone Labs C8051F320. The memory controller can also be achieved as a control logic portion of the memory. A person skilled in the art will know that, in addition to using pure computer-readable program code to implement a controller, it is possible to use logic programming for the method steps to enable a controller to achieve the same functions in the form of a logic gate, switch, application specific integrated circuit, programmable logic controller, or embedded microcontroller. Therefore, this type of controller may be treated as a type of hardware unit, and its included apparatus used to achieve various functions can also be treated as a structure within a hardware unit. Or it is possible to treat the apparatus used to achieve various functions as a software module for implementing the method as well as a structure within a hardware unit.

Some of the modules in the device of this disclosure can be described in the general context of computer-executable instructions executed by a computer, such as a program module. In various embodiments, program modules comprise routines, programs, objects, components, and data structures for executing specific tasks or achieving specific data abstraction. This disclosure can also be implemented in distributed computing environments. In these distributed computing environments, remote processing devices connected through a communications network are used for the execution of tasks. In a distributed computing environment, a program module can be located locally, including storage devices, and in remote computer storage media.

The preceding embodiment descriptions make it clear that a person skilled in the art can clearly understand that this disclosure may be achieved with the help of software plus the necessary hardware modes. Based on such an understanding, the essence of the technical scheme of this disclosure, or the part contributing to current technologies, may be implemented in the form of a software product, and may also be implemented through a data migration implementation process. This computer software product may be stored in a storage medium, such as a ROM/RAM, magnetic disk, or optical disk, and may include a number of instructions to cause a computer device (which may be a personal computer, mobile terminal, server, or network device) to perform the methods of the embodiments, or certain parts of the embodiments, of this disclosure.

The separate embodiments in this Description are described progressively, and it is sufficient for the embodiments to reference each other regarding their identical or similar parts. The description of each embodiment focuses on the ways differ from other embodiments. This disclosure, in whole or in part, may be used in a number of general purpose or specialized computer system environments or configurations, for example, personal computers, server computers, handheld devices or portable devices, tablet devices, mobile communication terminals, multiprocessor systems, microprocessor-based systems, programmable electronic devices, network PCs, minicomputers, mainframe computers, and distributed computing environments comprising any of these systems or devices, etc.

The invention claimed is:

1. An order processing method, comprising:
completing, by a computer device of a payment institution, a payment transaction for an order placed by a user with a delivering institution;
responsive to completing the payment transaction, redirecting, by the computer device of the payment institution, a browser of the user from a website of the payment institution to a website of the delivering institution, wherein the delivering institution delivers the order only when the redirecting is successful;
responsive to completing the payment transaction, activating, by the computer device of the payment institution, a virtual card through a virtual card payment network, wherein, when the order is delivered to the user, the delivering institution changes a virtual card status of the virtual card to indicate the order is delivered to the user; and
without intervention by the user,
(i) querying, by the computer device of the payment institution, the virtual card status of the order through the virtual card payment network to determine whether the order has been successfully delivered by the delivering institution, and
(ii) responsive to determining the order has not been successfully delivered, initiating, by the computer device of the payment institution, a refund operation for the order.

2. The method according to claim 1, wherein: the payment institution is domestic, the delivering institution comprises a foreign airline, and the order comprises a ticket issued by the delivering institution.

3. The method according to claim 1, wherein the querying, by the computer device of the payment institution, the virtual card status of the order comprises:
after each of a plurality of first time periods, querying the virtual card status, by the computer device of the payment institution, of one or more orders that were paid within the respective first time period but have a virtual card status of an unconfirmed preauthorization as the one or more orders have not been successfully delivered by the delivering institution; and
selecting, by the computer device of the payment institution, an order from the one or more orders that were paid within the respective first time period but have the virtual card status of the unconfirmed preauthorization.

4. The method according to claim 1, wherein the querying, by the computer device of the payment institution, a virtual card status of the order comprises:
determining, by the computer device of the payment institution, whether a second time period has elapsed since a current order was paid successfully;
if the second time period has elapsed since the current order was paid successfully, querying, by the computer device of the payment institution, whether a virtual card status of the current order is an unconfirmed preauthorization status as the current order has not been successfully delivered by the delivering institution; and
if the virtual card status of the current order is the unconfirmed preauthorization status, selecting, by the computer device of the payment institution, the current order.

5. The method according to claim 4, wherein different orders are designated with second time periods of different lengths.

6. An order processing system, comprising a processor and a non-transitory computer-readable storage medium storing instructions that, when executed by the processor, cause the order processing system to perform a method for a payment institution, the method comprising:
completing a payment transaction for an order placed by a user with a delivering institution;
responsive to completing the payment transaction, redirecting a browser of the user from a website of the payment institution to a website of the delivering institution, wherein the delivering institution delivers the order only when the redirecting is successful;
responsive to completing the payment transaction, activating a virtual card through a virtual card payment network, wherein, when the order is delivered to the user, the delivering institution changes a virtual card status of the virtual card to indicate the order is delivered to the user; and
without intervention by the user,
(i) querying the virtual card status of the order through the virtual card payment network to determine whether the order has been successfully delivered by the delivering institution, and
(ii) responsive to determining the order has not been successfully delivered, initiating a refund operation for the order.

7. The system according to claim 6, wherein: the payment institution is domestic, the delivering institution comprises a foreign airline, and the order comprises a ticket issued by the delivering institution.

8. The system according to claim 6, wherein the querying the virtual card status of the order comprises:
after each of a plurality of first time periods, querying the card status, by the computer device of the payment institution, of one or more orders that were paid within the respective first time period but have a virtual card status of an unconfirmed preauthorization, querying through the one or more orders that were paid within the first time period but have a virtual card status of an unconfirmed preauthorization as the one or more orders have not been successfully delivered by the delivering institution; and selecting an order from the one or more orders that were paid within the first time period but have the virtual card status of the unconfirmed preauthorization.

9. The system according to claim 6, wherein the querying a virtual card status of the order comprises:
   determining whether a second time period has elapsed since a current order was paid successfully;
   if the second time period has elapsed, querying whether a virtual card status of the current order is an unconfirmed preauthorization status; and
   if the virtual card status of the current order is the unconfirmed preauthorization status, selecting the current order as the current order has not been successfully delivered by the delivering institution.

10. The system according to claim 9, wherein different orders are designated with second time periods of different lengths.

11. A non-transitory computer-readable storage medium storing instructions that, when executed by a processor, cause the processor to perform an order processing method for a payment institution, the method comprising:
   completing a payment transaction for an order placed by a user with a delivering institution;
   responsive to completing the payment transaction, redirecting a browser of the user from a website of the payment institution to a website of the delivering institution, wherein the delivering institution delivers the order only when the redirecting is successful;
   responsive to completing the payment transaction, activating a virtual card through a virtual card payment network, wherein, when the order is delivered to the user, the delivering institution changes a virtual card status of the virtual card to indicate the order is delivered to the user; and
   without intervention by the user,
      (i) querying the virtual card status of the order through the virtual card payment network to determine whether the order has been successfully delivered by the delivering institution, and
      (ii) responsive to determining the order has not been successfully delivered, initiating a refund operation for the order.

12. The storage medium according to claim 11, wherein: the payment institution is domestic, the delivering institution comprises a foreign airline, and the order comprises a ticket issued by the delivering institution.

13. The storage medium according to claim 11, wherein the querying the virtual card status of the order comprises:
   after each of a plurality of first time periods, querying the card status, by the computer device of the payment institution, of one or more orders that were paid within the respective first time period but have a virtual card status of an unconfirmed preauthorization, querying through the one or more orders that were paid within the first time period but have a virtual card status of an unconfirmed preauthorization as the one or more orders have not been successfully delivered by the delivering institution; and
   selecting an order from the one or more orders that were paid within the first time period but have the virtual card status of the unconfirmed preauthorization.

14. The storage medium according to claim 11, wherein the querying a virtual card status of the order comprises:
   determining whether a second time period has elapsed since a current order was paid successfully;
   if the second time period has elapsed, querying whether a virtual card status of the current order is an unconfirmed preauthorization status; and
   if the virtual card status of the current order is the unconfirmed preauthorization status, selecting the current order as the current order has not been successfully delivered by the delivering institution.

\* \* \* \* \*